United States Patent [19]

Klingstedt et al.

[11] 4,444,372
[45] Apr. 24, 1984

[54] TENSILE FORCE ABSORBING ANCHORING IN CONCRETE

[75] Inventors: Ingvar Klingstedt; Holger E. Klingstedt, both of Skellefteå; Artur E. Berggren, Piteå, all of Sweden

[73] Assignee: Miljotakmontage AB, Skellefteå, Sweden

[21] Appl. No.: 276,356

[22] PCT Filed: Oct. 10, 1980

[86] PCT No.: PCT/SE80/00248

§ 371 Date: Jun. 10, 1981

§ 102(e) Date: Jun. 10, 1981

[87] PCT Pub. No.: WO81/01036

PCT Pub. Date: Apr. 16, 1981

[30] Foreign Application Priority Data

Oct. 11, 1979 [SE] Sweden ............................. 7908430
Sep. 4, 1980 [SE] Sweden ............................. 8006167

[51] Int. Cl.³ .............................................. A47H 1/10
[52] U.S. Cl. ...................................... 248/317; 248/327; 248/343; 411/15
[58] Field of Search ................ 248/317, 327, 342, 343, 248/71, 205 B, 0.58; 52/712; 411/15, 508, 379

[56] References Cited

U.S. PATENT DOCUMENTS

| | | | |
|---|---|---|---|
| 1,172,350 | 2/1916 | Freer | 411/379 |
| 1,733,083 | 10/1929 | Pleister | 411/15 |
| 2,878,668 | 3/1959 | Starling et al. | 248/205 B |
| 3,530,545 | 9/1970 | Lengyel | 248/317 |

Primary Examiner—Ramon S. Britts
Assistant Examiner—Ramon O. Ramirez
Attorney, Agent, or Firm—Burns, Doane, Swecker & Mathis

[57] ABSTRACT

At anchoring in concrete, plugs and/or expanders are used; which require relatively deep holes for providing the strength required. In order to reduce the necessary hole depth without deteriorating the strength, and in general to facilitate and render cheaper the anchoring in concrete and other hard material, the present tensile force absorbing anchoring comprises an anchoring member formed integral of steel wire, with an anchoring portion located in a hole in the material, which portion comprises two gripping members, each with a free end engaging with the hole wall. The members are formed integral, with each of their two shanks abutting an opposed side of the hole wall against the engaging surface of the free end of the respective gripping member and extending axially out of the hole. The shanks constitute parts of the leg portion of the anchoring member and form an acute angle with the respective gripping member, and each gripping member has a length between its free end and the associated shank which exceeds the hole diameter, and is stiff against bending along its entire length. The free end of the respective gripping member prior to the application of the anchoring member in its hole is located at a perpendicular distance from the associated shank which exceeds the hole diameter, for obtaining an inital clamping force at the application of the anchoring member in its hole.

6 Claims, 4 Drawing Figures

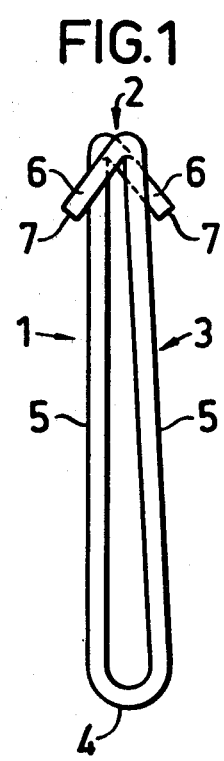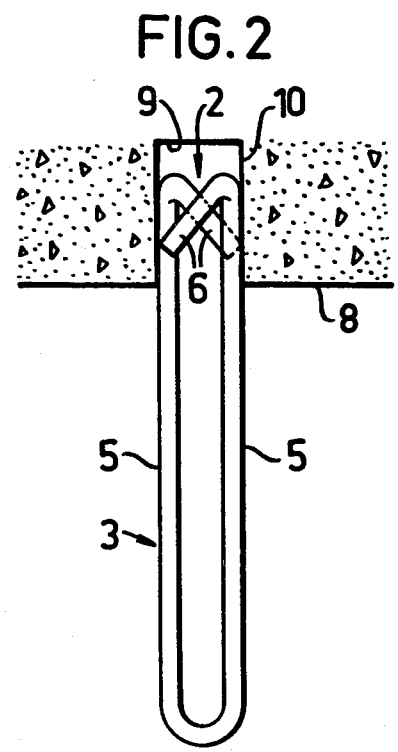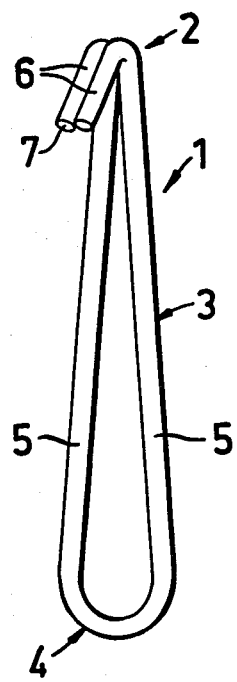

TENSILE FORCE ABSORBING ANCHORING IN CONCRETE

BACKGROUND AND SUMMARY OF THE PRESENT INVENTION

The present invention relates to a tensile force absorbing anchoring in concrete or another hard material, comprising an anchoring member and a hole in the material for receiving said member.

For anchoring a structure in concrete, such as a ceiling suspended from a concrete joist, plugs and/or expanding members are used which are entered into holes sunk into the concrete and which are tightened in the holes with the aid of screw or bolt means. Whether plugs or expanding members are employed, the anchoring in concrete is difficult and time-consuming and costly, as well, not the least by reason of the holes required for these known anchoring members having to be comparatively deep for affording the necessary strength, and of such depth, as a rule, that the reinforcements below the concrete surface are often encountered on sinking the holes. This considerably delays and makes costlier the sinking of the holes to a depth required for proper strength, or may entail breaking off the preparing of the holes before reaching the necessary depth, thereby causing the anchoring strength to be insufficient.

It is an object of the present invention, therefore, to provide a concrete anchoring free from the afore mentioned drawbacks and being such that it does not require any screw or bolt means for its securing or clamping in a hole, thus making for a quicker mounting than when known plugs or expanding members are used, which further requires only a considerably lesser depth of hole than the known anchoring members and in spite of this affords a strength which is improved over that attained with known anchoring means of the plug or expanding-member type, and which can be mounted quickly and in a simple manner. To a speedy mounting an important contribution is offered therethrough that the depth of the anchoring hole may be reduced considerably when practising the invention.

These objects and others are attained by providing a structure according to the present invention the characteristics defined in the claims.

BRIEF DESCRIPTION OF THE DRAWINGS

Preferred embodiments of the present invention are described hereinafter, reference being had to the drawing. In the drawing:

FIG. 1 is a perspective view of an anchoring member according to the invention,

FIG. 2 is a section view of an anchoring member received in an anchoring hole sunk into a concrete joist, FIG. 3 is a perspective view of a modified embodiment of the anchoring member and, FIG. 4 is a section view of a further embodiment according to the present invention received in an anchoring hole.

DETAILED DESCRIPTION OF THE PREFERRED EMBODIMENTS

Figure 4:
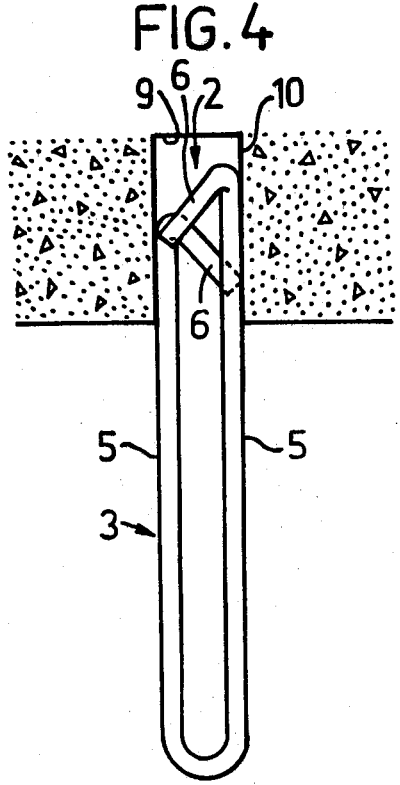

In the drawing an anchoring member 1 is shaped integrally of resilient steel wire, such as music-wire (pianosteel wire) or the like, and includes an anchoring portion 2 and a leg portion 3. This leg portion 3 is shaped as a substantially U-shaped fastening eye or loop and comprises more specifically two shanks 5 connected by an arcuate portion 4, whereas the anchoring portion 2 comprises two opposed gripping members 6 formed integrally with an associated shank 5 by being bent inward towards the shank. The gripping members 6 subtend an angle with the associated shank 5 which should be less than 90° and should be in the range 20°-70°, preferably 29°-61°, and being about 45° in the preferred embodiment illustrated in the drawing. Further, in the illustrated embodiment gripping members 6 having their free ends 7 pointing in opposite directions are overlapping in planes which are substantially parallel with the leg portion (the drawing plane in FIG. 2) and cross each other. In a further embodiment (FIG. 4), the gripping members 6 are staggered vertically. This entails the drawback of having to provide deeper holes for anchoring the member, however.

In FIG. 2 an anchoring member according to the invention is shown introduced into an anchoring hole 9 sunk into a concrete surface 8 from below. This anchoring hole should have a diameter, according to the invention, which has to be somewhat smaller (e.g. 1 to 5 millimeters) than the perpendicular distance between the free terminal surface 7 of the gripping member and the side of the corresponding shank facing away from said terminal surface, in the unloaded or non-activated state of the anchoring member. When entering the anchoring member 1 in the hole 9 thus the gripping members 6 will be resiliently forced towards the associated shank 5 by the hole wall 10. The gripping members 6 are consequently subjected to a prestressing action which will strive to make the free ends 7 of members 6 engage the hole wall 10 when the anchoring member 1 is pushed home into the hole 9. This engagment becomes stronger as soon as the shank portion 5 is subjected to a vertical pulling load. Such pulling load acts on the end of the gripping members facing away from its free end 7, and thereby the anchoring portion 2 will be pulled into a rigid engagement about the free ends 7 of the gripping members abutting the hole wall 10. The gripping members thus are wedged and clamped immovably between the hole walls with a force which grows greater with an increasing pulling load. This clamping force is somewhat dependent on the bending strength of the gripping members, but since these portions comprise a material of high stiffness such as spring steel and may be very short the flexural strength of the gripping members will be more than adequate for accommodating without rupture the pulling forces acting on the shanks 5 of the anchoring portion 2.

With regard to the hole depth, this need not be, in principle, greater than a few millimeters, for example 5 to 10 millimeters greater than the height of the anchoring portion. The latter, in its turn, can be as short as 4 to 10 millimeters. Thus a hole depth of about 15 millimeters is quite sufficient for this anchoring, and tests have proved that an anchoring member according to the invention, made of a spring-steel wire having a diameter of 2 millimeters and secured in a hole made in a concrete joist having a diameter of 8 millimeters and a depth of 15 millimeters, can take up a load of at least 300-350 kiloponds without giving way.

In FIG. 3 a modified embodiment of the anchoring member 1 according to the invention is shown, which differs from the member 1 shown in FIG. 1 only in that the two clamping or gripping members 6 each formed integral with its shank 5 are facing in the same direction and are in parallel with each other. Also at this embodiment the leg portion 3 is shaped as a fastening eye.

The invention is not restricted to the embodiments described above and illustrated on the drawing, but can be altered and modified in many different respects within the scope of the claims. This also applies for the measurements given above which are only given by way of example. Thus it may be pointed out that the angle subtended between the gripping member 6 and the associated shank 5 does not need to be that shown in the drawing, but may vary somewhat. In such case the length of the gripping members has to be made such as to suit the angle thereof, to make the distance between the free terminal face 7 and the associated shank the same for both gripping members.

The anchoring member according to the invention can be used for anchoring in concrete walls and ceilings, as well, provided that the load acts in the direction of the leg, and it can also be used for anchoring in sheet metal.

I claim:

1. A tensile force absorbing anchoring in hard material, such as for example concrete, rock, sheet metal or the like, comprising an anchoring member with an anchoring portion in a hole made in the material for cooperation with opposed wall portions of the hole, a leg portion extending from the hole and integral with the anchoring portion for applying a tensile force producing load, the anchoring portion being formed of steel wire and comprising two gripping members, each of the gripping members having a free end engaging one of the opposed wall portions of the hole, the gripping members being formed with a respective shank, each of the shanks abutting a wall portion of the hole opposite from the wall portion engaged by the free end of the respective gripping member and extending axially out of the hole, the shanks constituting portions of the leg portion of the anchoring member and forming an acute angle with the respective gripping member, each gripping member having a length between its free end and the associated shank which exceeds the hole diameter, the gripping members being stiff against bending along their entire length, and the free end of the respective gripping member prior to the application of the anchoring member in the hole being located at a perpendicular distance from the associated shank which distance exceeds the hole diameter for obtaining an initial clamping force upon the application of the anchoring member in the hole.

2. The anchoring as defined in claim 1, wherein the two gripping members are directed opposed to each other.

3. The anchoring as defined in claim 2, wherein the gripping members are located overlapping in planes substantially parallel with the leg portion.

4. The device according to claim 1, wherein the gripping members are located offset in a vertical direction relative to each other.

5. The device as defined in claim 1, wherein the angle between the gripping members and the associated shanks is the same for the two gripping members.

6. The device as defined in claim 1, wherein the shanks of the leg portion are connected to each other to form a substantially U-shaped fastening eye.

* * * * *